(12) United States Patent
Xia et al.

(10) Patent No.: US 8,077,571 B1
(45) Date of Patent: Dec. 13, 2011

(54) STORAGE MEDIA DEFECT DETECTION

(75) Inventors: Haitao Xia, Santa Clara, CA (US);
Yenyu Hsieh, San Jose, CA (US); Bac Pham, San Jose, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 844 days.

(21) Appl. No.: 11/999,505

(22) Filed: Dec. 5, 2007

(51) Int. Cl.
*G11B 20/18* (2006.01)
(52) U.S. Cl. ............... 369/53.17; 369/53.12; 369/53.15; 369/53.35; 369/53.42; 369/59.21
(58) Field of Classification Search ............... 369/53.12, 369/53.42, 53.17, 59.21
See application file for complete search history.

(56) References Cited

U.S. PATENT DOCUMENTS

| | | | |
|---|---|---|---|
| 5,212,677 A * | 5/1993 | Shimote et al. | 369/53.17 |
| 6,175,459 B1 * | 1/2001 | Tomita | 360/53 |
| 6,185,175 B1 * | 2/2001 | Zook | 369/53.35 |
| 2005/0232096 A1 * | 10/2005 | Van Helvoirt et al. | 369/44.25 |
| 2006/0133248 A1 * | 6/2006 | Ueda et al. | 369/53.15 |
| 2008/0284630 A1 * | 11/2008 | Kikugawa et al. | 341/155 |

* cited by examiner

*Primary Examiner* — Lixi C Simpson
(74) *Attorney, Agent, or Firm* — Van Pelt, Yi & James LLP

(57) ABSTRACT

Detecting a defect on a storage device is disclosed. Detecting includes receiving a signal read from a storage device, sampling the signal to obtain a set of signal samples, wherein the sampling starts at an arbitrary time, computing a defect value for a defect type using the set of signal samples, comparing the defect value with a threshold associated with the defect type, determining whether there is a defect of the defect type based at least in part on the comparison, and in the event that a defect is detected, outputting an indication associated with the defect.

45 Claims, 8 Drawing Sheets

STORAGE MEDIA DEFECT DETECTION

BACKGROUND OF THE INVENTION

Storage media, including magnetic media such as hard disk drives, include defects that result from manufacturing (e.g., present in a brand new or virgin disk drive) and/or from the environment or usage over time. At a defect location, data cannot be reliably written to the media. For example, when reading data at a defect location, an overly strong signal (e.g., that saturates a circuit), a weak signal, or no signal at all may be read. Defect scanners are used to create a map of defect locations so that these locations are not written to or read from. Typically, a defect scan is performed on a new disk drive and a map is obtained in this way.

Current defect scanning techniques are inefficient. Typical defect maps have limited resolution and can only indicate defect locations down to the sector level. In other words, typical defect scanners are only able to determine in which sector a defect is located. Even though a defect region may be much smaller than a sector, the entire sector is unused, which is inefficient. In addition, typical defect scanners require peak samples (e.g., a local maximum) as input. This means that the signal timing must first be acquired (i.e., so that the location of the peaks is known), which requires a timing loop and takes additional time. In addition, defects that occur before the timing is acquired (e.g., in a preamble or beginning portion) are not detected. As such, improved defect detection techniques would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
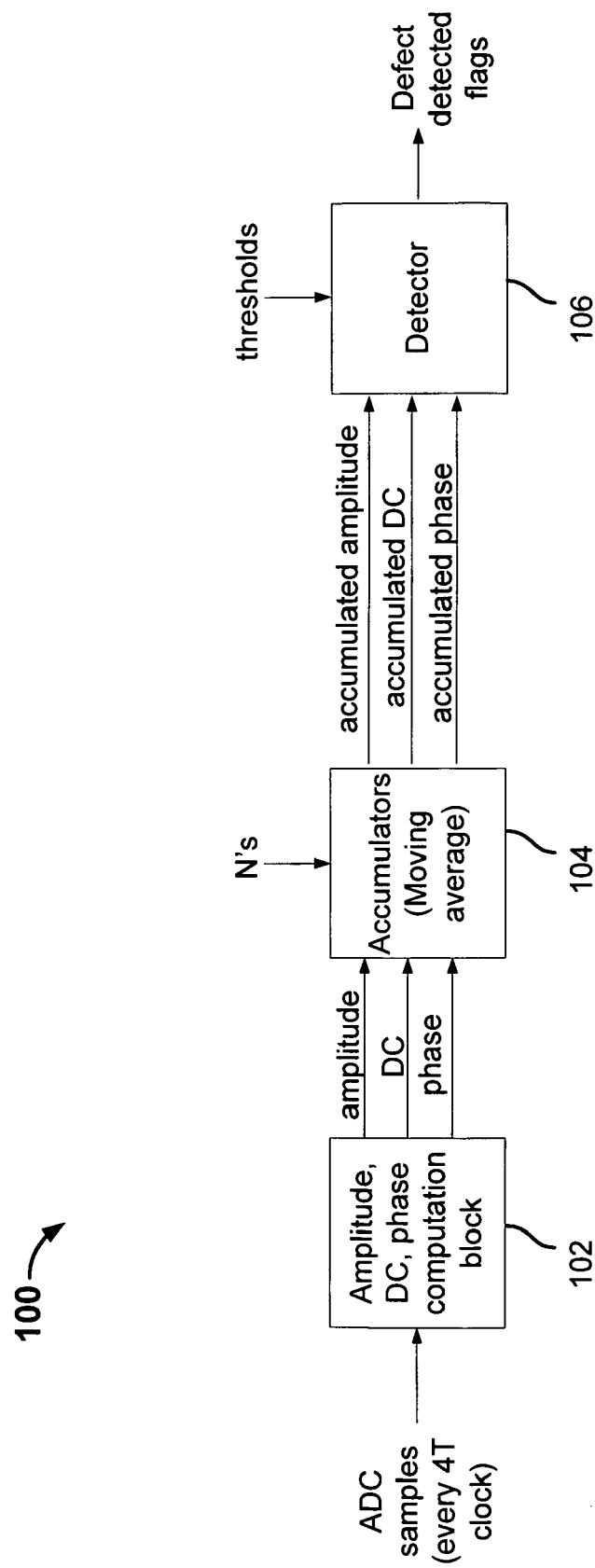
FIG. 1 is a block diagram illustrating an embodiment of a system for detecting media defects.

FIG. 1 is a block diagram illustrating an embodiment of a system for detecting media defects. Examples of media include storage media, such as magnetic media and hard disk drives. There are a number of different types of defects, including the following:

(1) Drop in/drop out defects are associated with an amplitude boost or loss defects of greater than approximately 5% or more compared to a normal or ideal signal.

(2) Shallow defects are associated with an amplitude boost or loss of approximately 5% or less compared to a normal or ideal signal.

(3) Thermal asperity (TA) defects are associated with a sudden DC (direct current) jump or offset.

(4) Timing defects are associated with a sudden phase jump in a signal. This includes changes in frequency, such as a pulse becoming narrower or wider.

In the example shown, system 100 is shown to include computation block 102, accumulators 104, and detector 106. ADC (analog to digital converter) samples are read from a storage device and provided as input to computation block 102. Computation block 102 computes an amplitude, a DC component, and/or a phase using the ADC samples. In various embodiments, the same or a different number of samples are used to compute the amplitude, the DC component, and/or the phase. In some embodiments, 4 samples are used to compute the amplitude, the DC component, and the phase. The amplitude, the DC component, and/or the phase are output from computation block 102 and provided as input to accumulators 104.

Accumulators 104 (which may include one or more accumulators) are used to compute a moving average of the amplitude, the DC component, and the phase over $N_A$, $N_D$, and $N_P$ samples, respectively. ($N_A$, $N_D$, and $N_P$ are the "N's" referred to in FIG. 1.) In this example, accumulators 104 output an accumulated amplitude, an accumulated DC component, and an accumulated phase, which are provided as input to detector 106. Detector 106 uses the accumulated amplitude, the accumulated DC component, and the accumulated phase and thresholds $T_A$, $T_D$, and $T_P$, respectively, to detect the various types of defects. Accumulators 104 are optional and in some embodiments, one of more of the amplitude, the DC component and the phase are not averaged.

In some embodiments, detector 106 compares a defect value with a threshold to determine whether a defect is present. In some embodiments, the defect values and/or thresholds are different for different defect types. For example, for a thermal asperity defect, the defect value is the accumulated DC component $|D_{acc}|$ and the threshold is $T_D$. If $|D_{acc}|>T_D$, then a thermal asperity defect is detected. More detailed examples are described below.

The outputs of detector 106 are defect flags corresponding to the locations of the defects. In some embodiments, the defect flags are stored in a defect map that is used by the hard disk controller (HDC) so it knows not to read or write to the defect locations.

Using the techniques described herein, defects associated with any of the defect types can be detected all in one shot, or simultaneously (i.e., in parallel) as opposed to sequentially (i.e., one at a time). Simultaneous detection is faster than sequential detection. In addition, the thresholds and/or defect scan resolutions (associated with N) for each defect type are programmable inputs. In some embodiment, system 100 is implemented entirely in digital circuitry and analog circuitry is not used.

Figure 2A:
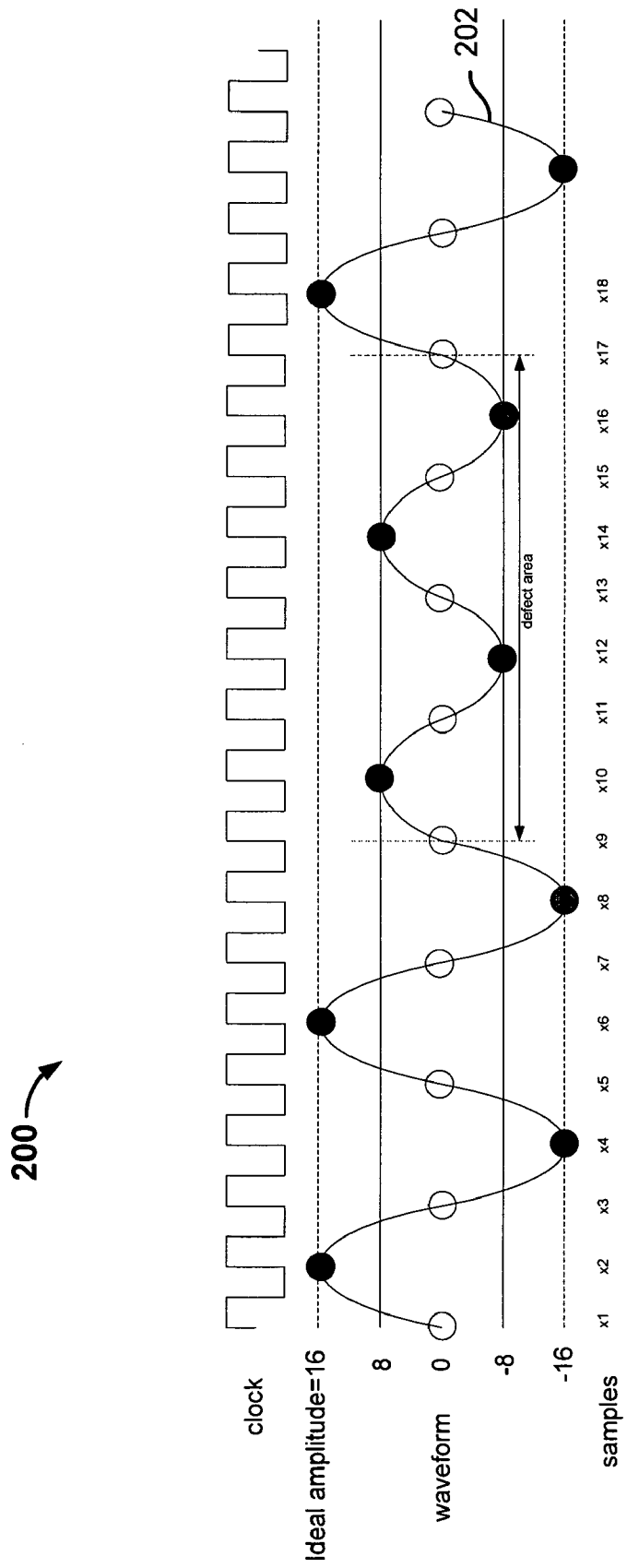
FIG. 2A is a diagram illustrating an example of a read-back waveform and peak samples.

FIG. 2A is a diagram illustrating an example of a read-back waveform and peak samples. A read-back waveform is a signal read-back from a storage device, such as a hard disk drive. In the example shown, diagram 200 shows read-back waveform 202, circled peak ADC samples at x2, x4, x6, etc, and circled zero-crossing samples at x1, x3, x5, etc. A pattern of "1100" is repeatedly written to a hard disk in order to obtain read-back waveform 202. In some embodiments, some other (e.g., repeated) pattern is used. The ideal amplitude of read-back waveform 202 is 16, as indicated in FIG. 2A. An example of a drop in/drop out defect is shown between x9 and x17. In this case, the amplitude loss is 50% (a drop in amplitude from 16 to 8).

In some other defect scanners, the samples used to detect the defect area shown are required to be peak samples as shown at x2, x4, x6, etc. As used herein, "peak samples" are samples that coincide with the peaks of the signal. Peak sampling corresponds to a sampling phase offset equal to zero. This means that before a defect can even be detected, timing acquisition (which uses a timing loop) needs to be performed in order to determine the location of the peaks and be able to sample at the peaks. Defects that occur or coincide with the portions of a read back waveform used to perform timing acquisition are not detected. For example, timing acquisition may be performed between x1 and x12, in which case the portion of the defect area between x9 and x12 would not be detected. Also, by using peak samples x2, x4, x6, etc. only, and skipping zero-crossing samples such as x1, x3, x5, etc., the detection is more vulnerable to noise than fully using all samples x1, x2, x3, x4, etc. Thus, it would be desirable to have a defect detection technique that does not require timing acquisition to first be performed and/or does not require use of a timing loop for defect detection. Such techniques are disclosed herein.

Figure 2B:
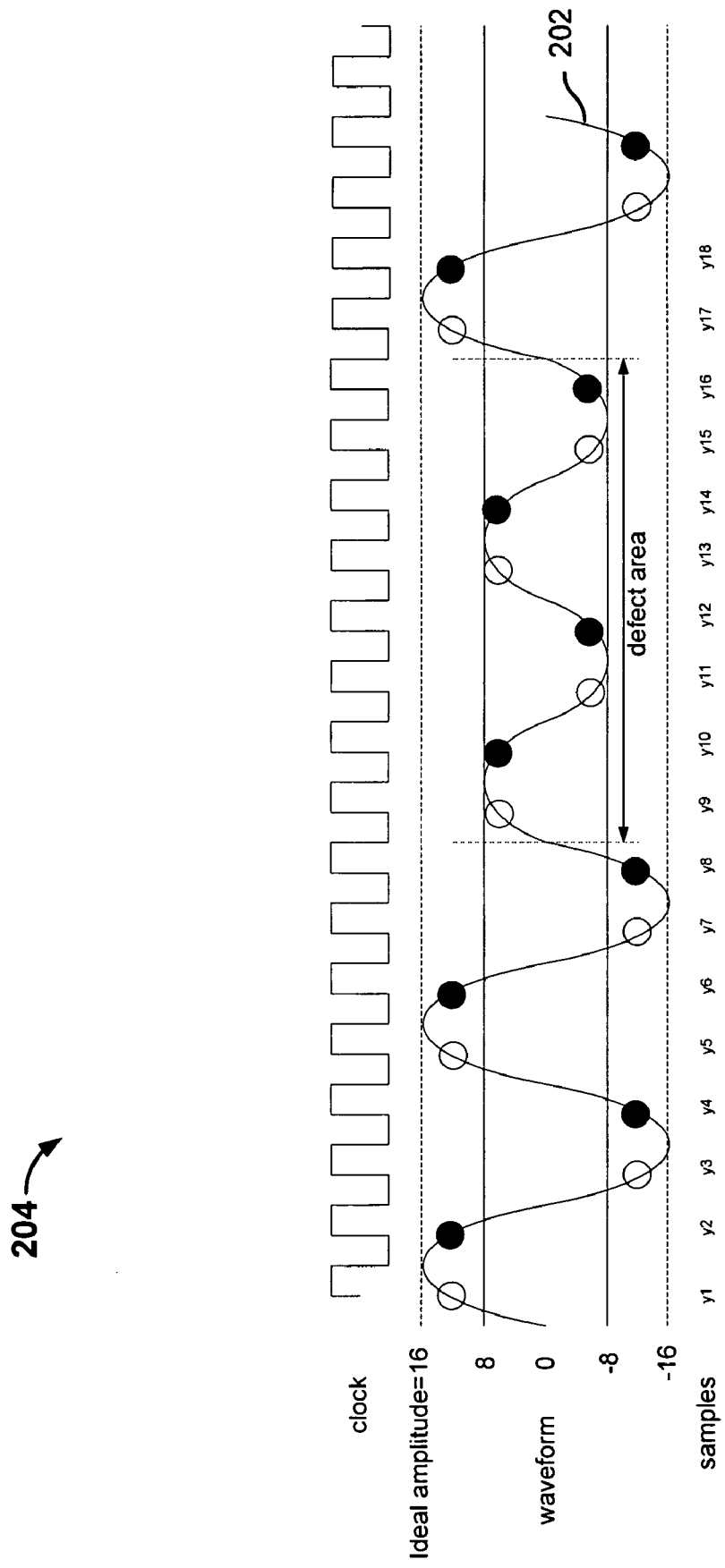
FIG. 2B is a diagram illustrating an example of a read-back waveform and samples with an arbitrary phase offset.

FIG. 2B is a diagram illustrating an example of a read-back waveform and samples with an arbitrary phase offset. Sampling with an arbitrary phase offset means that the sampling starts at an arbitrary time, and not necessarily at zero phase offset, which corresponds to peak sampling. Any appropriate phase offset may be used in various embodiments. In the example shown, diagram 204 shows read-back waveform 202 and circled ADC samples at y1, y2, y3, y4, y5, y6, etc. A pattern of "1100" is repeatedly written to a hard disk in order to obtain read-back waveform 202. A drop in/drop out defect area is shown between y8 and y17. Using the defect detection techniques described herein, sampling may start at an arbitrary time and samples y1, y2, y3, y4, y5, y6, etc. are not required to be peak samples. This means that a defect can be detected starting with the first sample y1. In other words, a defect can be detected immediately after the start of sampling.

The defect detection techniques described herein do not require timing acquisition to first be performed nor do they require use of a timing loop.

Figure 3:
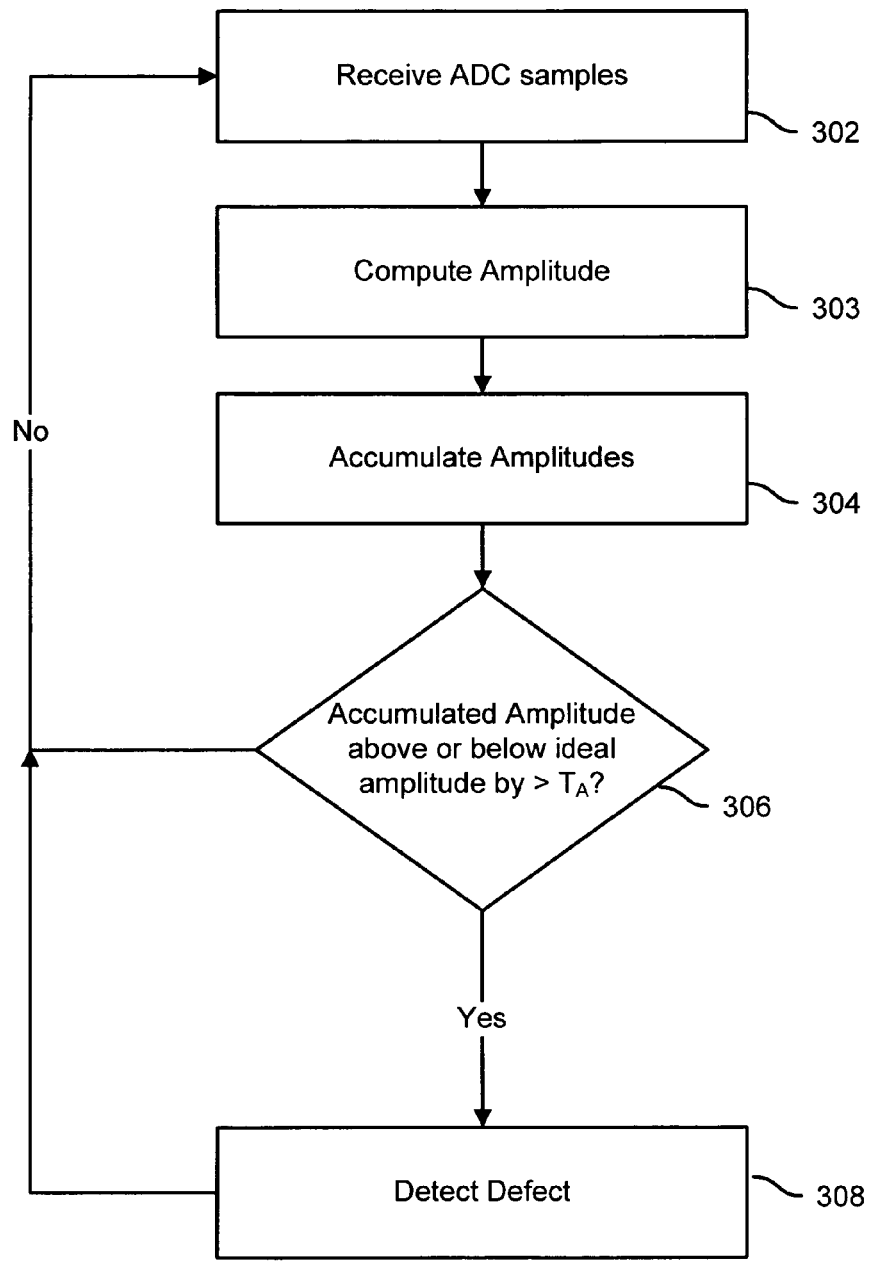
FIG. 3 is a flow chart illustrating an embodiment of a process for detecting a defect associated with amplitude.

FIG. 3 is a flow chart illustrating an embodiment of a process for detecting a defect associated with amplitude. Examples of defects associated with amplitude include drop in/drop out defects and shallow defects.

The process may be implemented by system 100. At 302, ADC samples are received. For example, computation block 102 receives ADC samples. If a pattern of "1100" is written to the hard disk drive (i.e., so that the read-back waveform is a sine wave), and y1-y4 are four ADC samples of the read-back waveform, then:

$y1 = A \sin(\theta)$
$y2 = A \cos(\theta)$
$y3 = -A \sin(\theta)$
$y4 = -A \cos(\theta)$ where A is the amplitude.

At 303, an amplitude is computed. For example, computation block 102 computes an amplitude. If the sampled signal is a sine wave, the amplitude may be computed as follows:

$$A = ((y1-y3)^2 + (y2-y4)^2)^{1/2}$$

where A is the amplitude. In some embodiments, a look up table is used for this computation. In various embodiments, various equations may be used to compute the amplitude.

At 304, amplitudes $A_i$ are accumulated or averaged to remove white noise or AWGN (additive white Gaussian noise) effects. For example, accumulators 104 may accumulate the amplitudes. In some embodiments, amplitudes are accumulated as follows:

$$A_{acc} = (\Sigma A_i)/(\tfrac{1}{4} N_A)$$

where:
$A_{acc}$ is the accumulated amplitude
$\Sigma$ is a summation from i=1 to ¼ $N_A$
$A_i$ is the $i^{th}$ amplitude
$N_A$ is the number of samples over which to average If A is computed using 4 samples y1-y4, then $A_i$ can be computed in a variety of ways. For example:

$$A_1 = ((y1-y3)^2 + (y2-y4)^2)^{1/2}$$

$$A_2 = ((y5-y6)^2 + (y7-y8)^2)^{1/2}$$

$$A_3 = ((y9-y10)^2 + (y11-y12)^2)^{1/4}$$

etc.

In this example, every 4 samples, one amplitude $A_i$ is computed. Therefore, in this example, $\Sigma$ is a summation from i=1 to ¼ $N_A$.

Any similar or equivalent technique for removing white noise or AWGN effects may be used. For example, just $\Sigma A_i$ may be taken and $N_A$ accounted for later.

At 306, it is determined whether the accumulated amplitude is above or below the ideal amplitude by more than a threshold. In other words, it is determined whether:

$$A_{acc} > A_{ideal} + T_A$$

or $$A_{acc} < A_{ideal} - T_A$$

where
$A_{ideal}$ is the ideal amplitude
$T_A$ is a threshold
There are two types of amplitude defects:

(1) Drop in/drop out defects are associated with an amplitude boost or loss defects of greater than approximately 5% compared to a normal or ideal signal.

(2) Shallow defects are associated with an amplitude boost or loss of approximately 5% or less compared to a normal or ideal signal.

For drop in/drop out defects, $T_A=5\%$ of $A_{ideal}$ In various embodiments, other percentages besides 5% may be used to compute the amplitude. For example, to detect amplitude defects of 20%, $T_A=20\%$ of $A_{ideal}$ may be used.

In some cases, multiple thresholds can be set during amplitude defect detection. In such cases, the output of detector 106 indicates the range of percentages associated with the amplitude defect at a fine amplitude resolution (different from the defect location resolution), where the fine amplitude resolution is associated with $N_A$. For example: $T_{A1}=5\%$ of $A_{ideal}$, $T_{A2}=10\%$ of $A_{ideal}$, $T_{A3}=15\%$ of $A_{ideal}$, etc. If $A_{acc}>A_{ideal}+T_{A1}$ but $A_{acc}<A_{ideal}+T_{A2}$, the output of detector 106 indicates that the amplitude defect is between 5% to 10%.

For shallow defects, $T_A=P_{shallow}\%$ of $A_{ideal}$
where $P_{shallow}<5\%$

In some embodiments, $N_A$ is different for the two types of amplitude defects. $N_A$ for shallow defects may be larger because more white noise needs to be removed in order to detect smaller amplitude defects.

If at 306, it is determined that the accumulated amplitude is above or below the ideal amplitude by more than a threshold, then a defect is detected at 308. For example, defect detector 106 may perform this determination. The defect location is associated with the samples used to compute the accumulated amplitude. Therefore, the defect resolution (i.e., the resolution of the defect location) is $N_A$. In some embodiments, information about the defect, such as the location of the defect in media, is recorded or written (e.g., to a defect map).

The process returns to 302 and the next set of ADC samples is analyzed.

As previously described with respect to FIG. 1, a defect value is compared with a threshold to determine whether there is a defect. In this example, the defect value is the accumulated amplitude $A_{acc}$ and the threshold is $T_A$.

Figure 4:
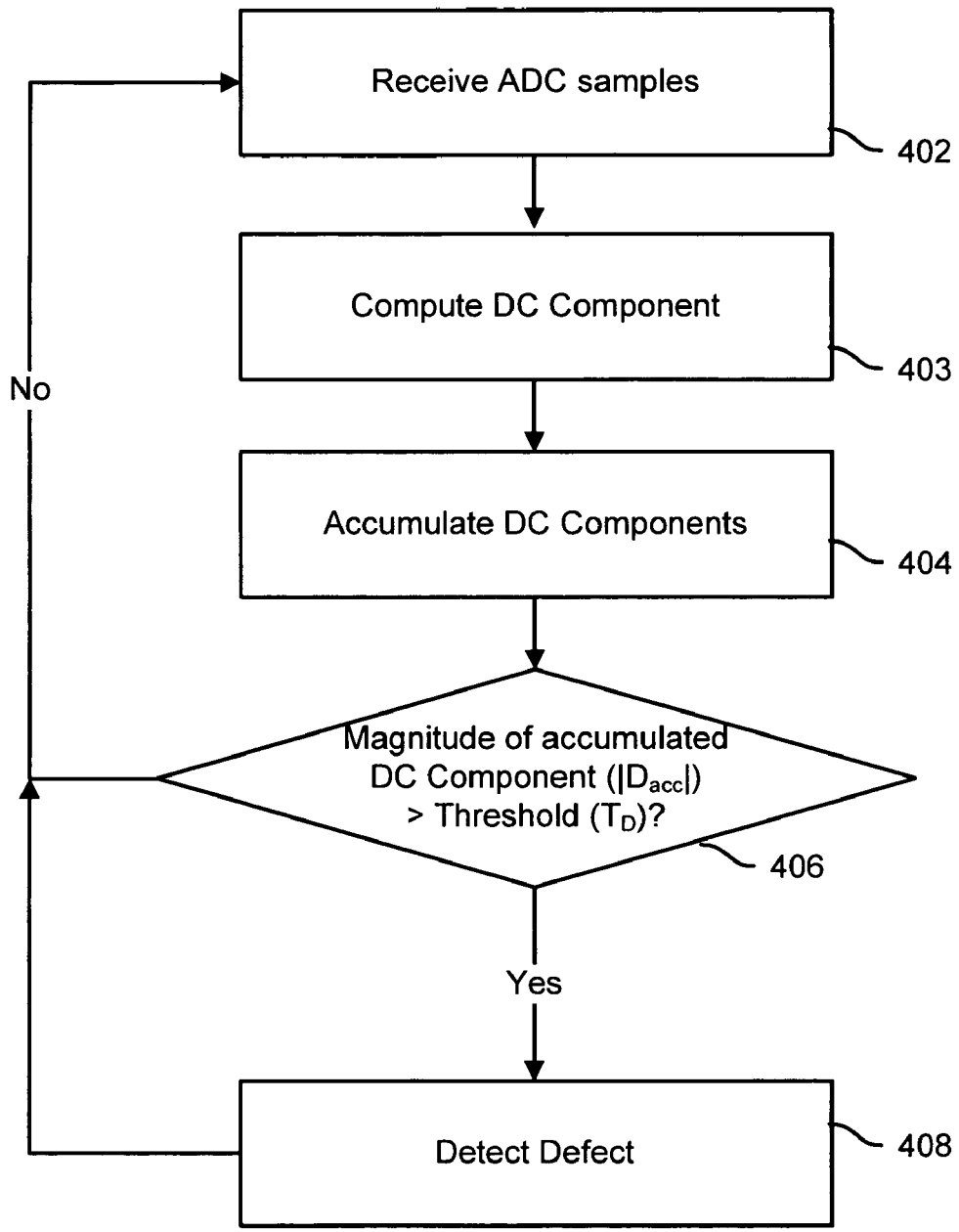
FIG. 4 is a flow chart illustrating an embodiment of a process for detecting a defect associated with a DC component.

FIG. 4 is a flow chart illustrating an embodiment of a process for detecting a defect associated with a DC component. Examples of defects associated with a DC component include thermal asperity (TA) defects.

The process may be implemented by system 100. At 402, ADC samples are received. For example, computation block 102 receives ADC samples. For example, y1-y4 are four ADC samples of the read-back waveform when a pattern of "1100" is written to the hard disk drive (i.e., so that the read-back waveform is a sine wave), as previously described.

At 403, a DC component is computed. For example, computation block 102 computes a DC component. If the sampled signal is a sine wave, the DC component may be computed as follows:

$$D=y1+y2+y3+y4$$

where D is the DC component. In various embodiments, various equations may be used to compute the DC component.

At 404, DC components $D_i$ are accumulated or averaged to remove white noise or AWGN effects. For example, accumulators 104 may accumulate the DC components. In some embodiments, DC components are accumulated as follows:

$$D_{acc}=(\Sigma D_i)/(\tfrac{1}{4}N_D)$$

where:
$D_{acc}$ is the accumulated DC component
$\Sigma$ is a summation from i=1 to $\tfrac{1}{4}N_D$
$D_i$ is the $i^{th}$ DC component
$N_D$ is the number of samples over which to average Any similar or equivalent technique for removing white noise or AWGN effects may be used, some examples of which were described above.

At 406, it is determined whether the magnitude of the accumulated DC component is above a threshold. In other words, it is determined whether:

$$|D_{acc}|>T_D$$

where $T_D$ is a threshold

If at 406, it is determined that the accumulated DC component is above a threshold, then a defect is detected at 408. For example, defect detector 106 may perform this determination. The defect location is associated with the samples used to compute the accumulated DC component. Therefore, the defect resolution is $N_D$. In some embodiments, the location of the defect or other information associated with the defect is written or stored.

The process returns to 402 and the next set of ADC samples is analyzed.

As previously described with respect to FIG. 1, a defect value is compared with a threshold to determine whether there is a defect. In this example, the defect value is the magnitude of the accumulated DC component $|D_{acc}|$ and the threshold is $T_D$.

Figure 5:
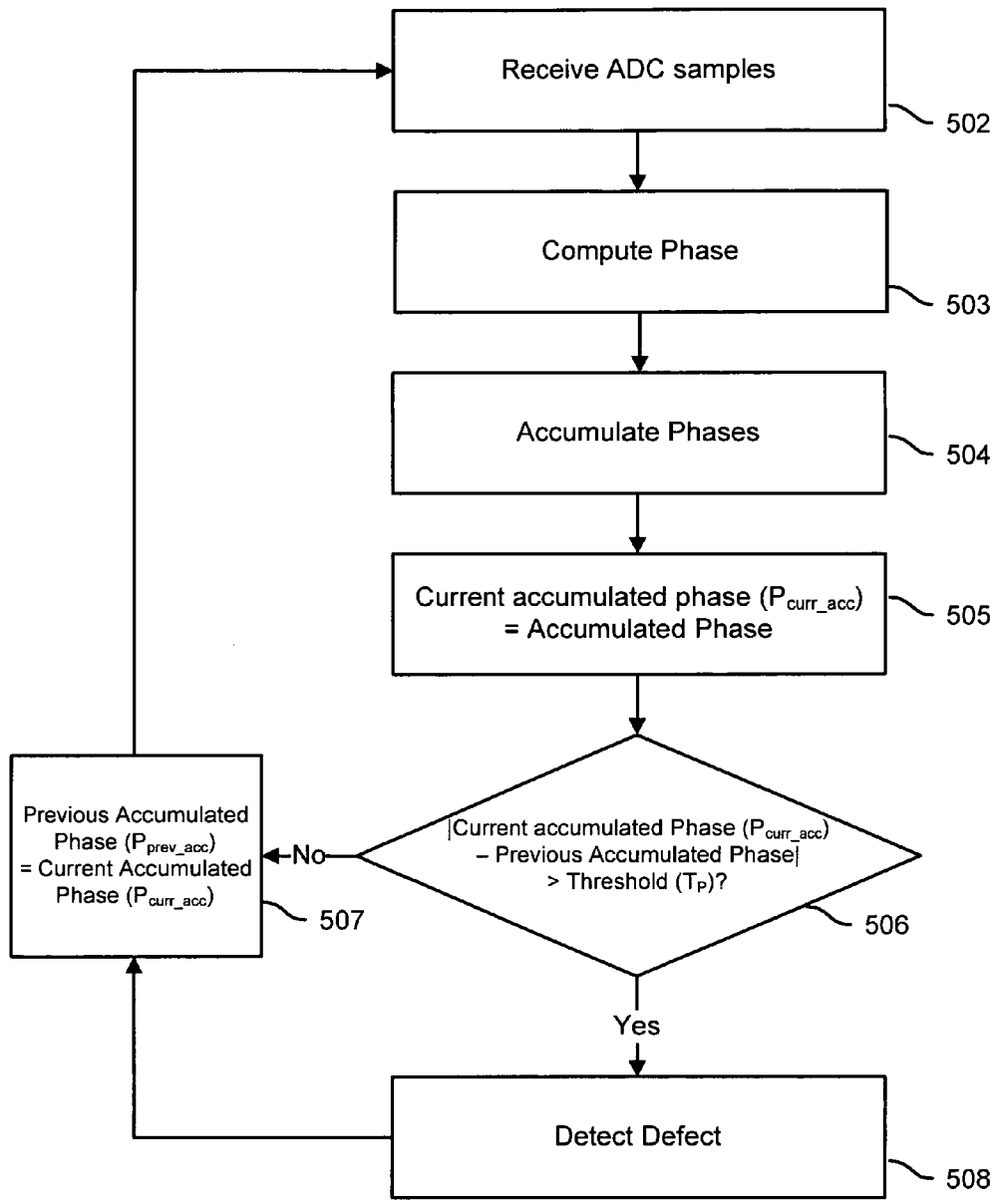
FIG. 5 is a flow chart illustrating an embodiment of a process for detecting a defect associated with phase.

FIG. 5 is a flow chart illustrating an embodiment of a process for detecting a defect associated with phase. Examples of defects associated with phase include timing defects.

The process may be implemented by system 100. At 502, ADC samples are received. For example, computation block 102 receives ADC samples. For example, y1-y4 are four ADC samples of the read-back waveform when a pattern of "1100" is written to the hard disk drive (i.e., so that the read-back waveform is a sine wave), as previously described.

At 503, a phase is computed. For example, computation block 102 computes a phase. If the sampled signal is a sine wave, the phase component may be computed as follows:

$$P=\arctan((y1-y3)/(y2-y4))$$

where P is the phase. In various embodiments, various equations may be used to compute the phase.

In some embodiments, a look up table is used for this computation. In some embodiments, if there is a frequency offset, the phase is unwrapped to maintain a linear plot of phase versus sample number, as describe more fully below.

At 504, phases $P_i$ are accumulated or averaged to remove white noise or AWGN effects. For example, accumulators 104 may accumulate the phases. In some embodiments, phases are accumulated as follows:

$$P_{acc}=(\Sigma P_i)/(\tfrac{1}{4}N_P)$$

where:
$P_{ace}$ is the accumulated phase
$\Sigma$ is a summation from i=1 to $\tfrac{1}{4}N_P$
$P_i$ is the $i^{th}$ phase
$N_P$ is the number of samples over which to average Any similar or equivalent technique for removing white noise or AWGN effects may be used, some examples of which were described above.

At 505, a current accumulated phase is set equal to the accumulated phase. In other words:

$$P_{curr\_acc}=P_{acc}$$

where $P_{curr\_acc}$ is the current accumulated phase

At 506, it is determined whether the difference between the current accumulated phase and the previous accumulated phase is above a threshold. In other words, it is determined whether:

$$\Delta P_{acc} > T_P$$

where $$\Delta P_{acc} = |P_{curr\_acc} - P_{prev\_acc}|$$

$T_P$ is a threshold

If 506 is being performed for the first time (i.e., this is the first iteration), then the comparison of $\Delta P_{acc} > T_P$ is skipped and the process proceeds to 507, which is described below.

If at 506, it is determined that the difference is above a threshold, then a defect is detected at 508. For example, defect detector 106 may perform this determination. The defect location is associated with the samples used to compute the difference. Therefore, the defect resolution is $N_P$.

At 507, the previous accumulated phase is set equal to the current accumulated phase. In other words:

$$P_{prev\_acc} \leftarrow P_{curr\_acc}$$

where $P_{prev\_acc}$ is the previous accumulated phase

The process returns to 502 and the next set of ADC samples is analyzed.

As previously described with respect to FIG. 1, a defect value is compared with a threshold to determine whether there is a defect. In this example, the defect value is the difference between the current and previous accumulated phases $\Delta P_{acc}$ and the threshold is $T_P$.

Figure 6:
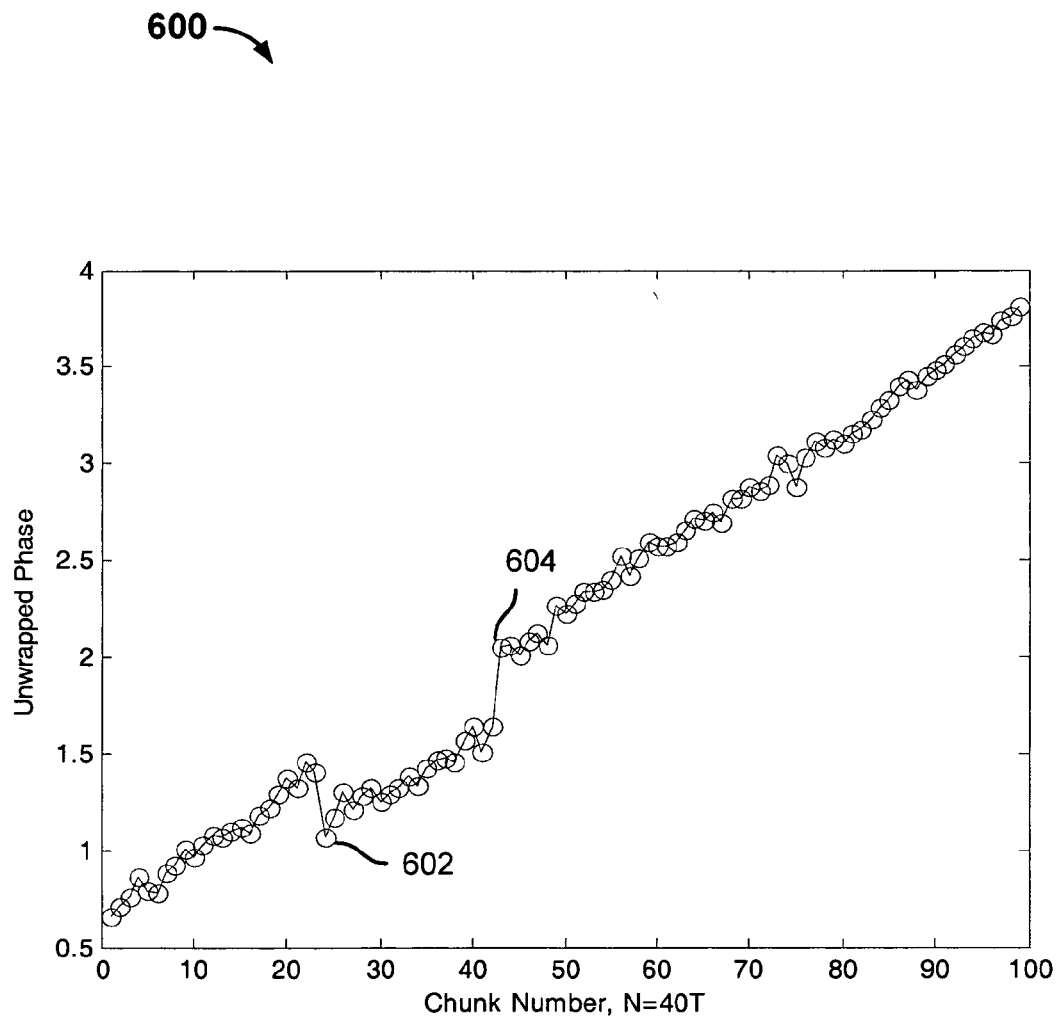
FIG. 6 is an example of a plot of accumulated phase versus phase chunks.

FIG. 6 is an example of a plot of accumulated phase versus phase chunks. In this example, plot 600 shows unwrapped phase on the y-axis and chunk number on the x-axis. Each point is an accumulated phase over $N_P$ samples. Each chunk is $N_P$ samples. In other words, $\Delta P_{acc} = |P_{curr\_acc} - P_{prev\_acc}|$ is the vertical difference between two consecutive points in plot 600. As shown, the difference between any two consecutive points suddenly drops at or about chunk 602 and suddenly jumps at or about chunk 604. The drop and jump are greater than the threshold $T_P$ and therefore a timing defect is detected between and/or at chunks 602 and 604.

Each chunk corresponds to $N_P$ samples, where $N_P=40$ in this example. (T is the period between samples.) The slope of the line is the frequency offset. If there is no frequency offset, the slope would be 0 (i.e., the line would be horizontal). In some embodiments, if there is a frequency offset, a phase unwrap circuit is used to unwrap the phase to make the plot linear.

Figure 7:
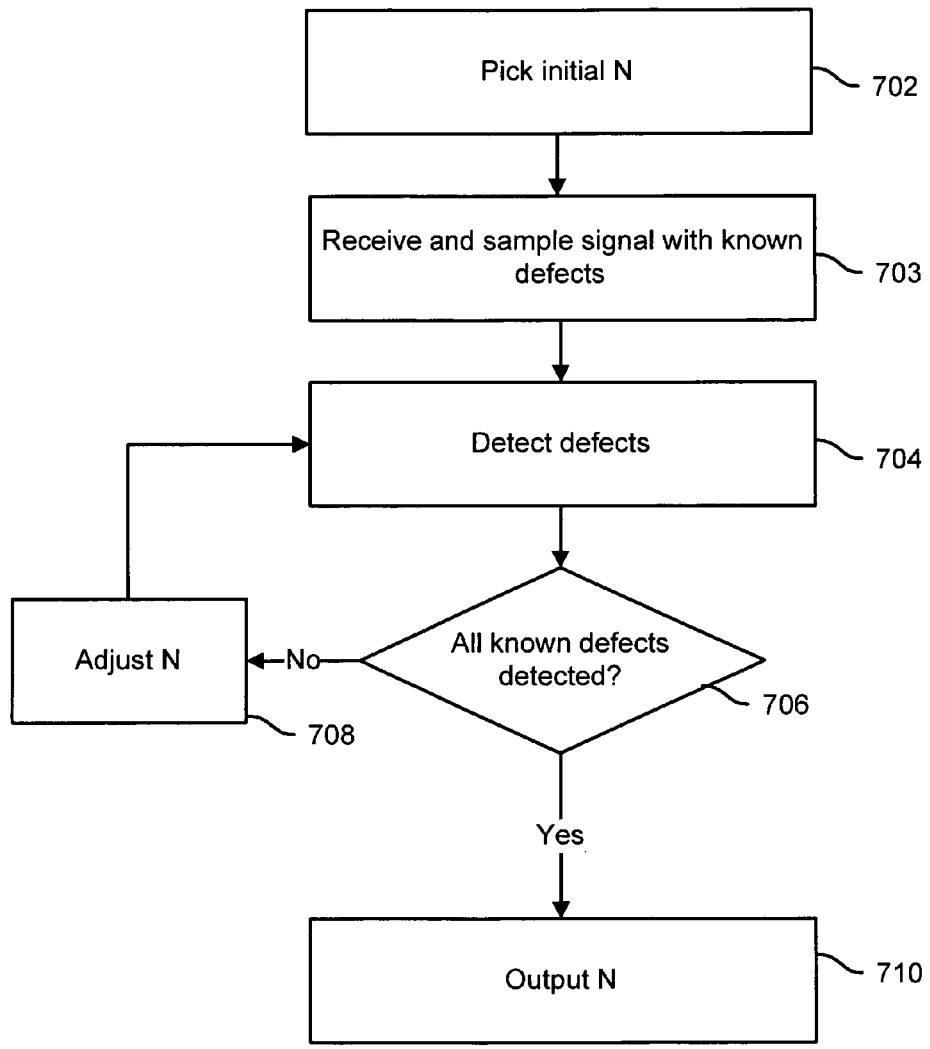
FIG. 7 is a flow chart illustrating an embodiment of a process for fine tuning N for a defect detection system.

FIG. 7 is a flow chart illustrating an embodiment of a process for fine tuning N for a defect detection system, such as system 100. N is the number of samples over which an average is performed. This process may be used to fine tune $N_A$, $N_D$, or $N_P$, for example. In this example, the goal is to obtain the minimum N that is required in order to detect a certain percentage (e.g., 100%) of the defects. The larger N, the greater the number of samples, and the more accurate the detection. The smaller N, the fewer the number of samples, and the higher the resolution of the location of the defects. If 4 samples are used to compute a defect value, then N is a multiple of 4.

At 702, an initial N is selected. In some embodiments, the initial N is 1, which corresponds to no accumulation or averaging. At 703, a signal with known defects is received and sampled. In some embodiments, an artificial signal is constructed by starting with an ideal signal and adding defects and AWGN. For example, to determine $N_A$ for detecting drop in/drop out defects, artificial (known) amplitude boosts and/or losses of 5% or more are added to the signal. In some embodiments, the artificial signal is pre-sampled and the artificial samples are received.

At 704, defects are detected according to the process of FIG. 3, 4, or 5, depending on which of $N_A$, $N_D$, or $N_P$, respectively, is being fine tuned. For example, in system 100, the artificial samples are provided as input to computation block 102 and detected defects are obtained at the output of detector 106.

At 706, it is determined whether all known defects were detected. For example, the output of detector 106 is compared with the known defects. If all defects were not detected, N is adjusted at 708. For example, N is incremented by 1. The process returns to 704. If all defects were detected, then that N is output at 710. The N that is output is the minimum N such that all defects are detected.

In some embodiments, it is acceptable to have some percentage other than 100% of defects detected, e.g., 99.999%. In such embodiments, at 706, it is determined whether that percentage (e.g., 99.999%) of the known defects were detected.

In some embodiments, the process of FIG. 7 is performed for a variety of defect types and thresholds and tables of the minimum N to obtain 100% defect detection for different combinations of defect types and thresholds can be constructed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting a defect on a storage device, comprising:
   receiving a signal read from a storage device;
   sampling the signal with an arbitrary phase offset to obtain a set of signal samples;
   computing with a processor a defect value for a defect type using the set of signal samples, wherein the defect value is computed at least in part based on a relationship corresponding to a sine waveform, and wherein computing includes computing the difference between a first sample and a third sample in a sequence of three samples to obtain a first difference;
   comparing the defect value with a threshold associated with the defect type;
   determining whether there is a defect of the defect type based at least in part on the comparison; and
   in the event that a defect is detected, outputting an indication associated with the defect.

2. The method as recited in claim 1, wherein at least one of the signal samples does not coincide with a peak of the signal.

3. The method as recited in claim 1, wherein computing includes using four signal samples to compute the defect value.

4. The method as recited in claim 1, wherein the set of signal samples is a sequence of signal samples that are sampled at a prescribed sampling rate.

5. The method as recited in claim 1, wherein the defect type includes a drop in/drop out amplitude defect associated with an amplitude gain or loss of 5% or more.

6. The method as recited in claim 1, wherein the defect type includes a shallow amplitude defect associated with an amplitude gain or loss of 5% or less.

7. A method as recited in claim 1, wherein the defect type includes a thermal asperity defect associated with a DC offset.

8. A method as recited in claim 1, wherein the defect type includes a timing defect associated with a phase jump in the signal.

9. The method as recited in claim 1, wherein the defect value is an accumulated defect value that is computed at least in part by summing a first defect value with a second defect value.

10. A method as recited in claim 1, wherein the defect value is based at least in part on an amplitude value or a DC component value.

11. A method as recited in claim 1, wherein the defect value is computed at least in part by taking the difference between a first phase and a second phase.

12. A method as recited in claim 1, wherein the defect value is computed at least in part by taking the difference between a first accumulated phase and a second accumulated phase.

13. The method as recited in claim 1, wherein computing further includes squaring the first difference to obtain a first squared distance.

14. The method as recited in claim 13, wherein computing further includes summing the first squared difference and a second squared difference to obtain a sum of squared differences.

15. The method as recited in claim 14, wherein computing further includes taking the square root of the sum of squared differences.

16. A method as recited in claim 1, wherein computing includes summing the set of signal samples.

17. A method as recited in claim 1, wherein computing further includes dividing the first difference by a second difference to obtain a ratio of differences.

18. A method as recited in claim 17, wherein computing further includes taking the arctangent of the ratio of differences.

19. The method as recited in claim 1, wherein computing includes using a look up table.

20. The method as recited in claim 1, wherein comparing includes determining whether the defect value is greater than the threshold.

21. The method as recited in claim 20, wherein determining includes in the event that the defect value is greater than the threshold, determining that there is a defect.

22. The method as recited in claim 1, wherein the indication includes a location of the defect within a given resolution.

23. A system for detecting a defect on a storage device, comprising:
 a processor configured to:
 receive a signal read from a storage device;
 sample the signal with an arbitrary phase offset to obtain a set of signal samples;
 compute a defect value for a defect type using the set of signal samples, wherein the defect value is computed at least in part based on a relationship corresponding to a sine waveform, and wherein computing a defect value includes computing the difference between a first sample and a third sample in a sequence of three samples to obtain a first difference;
 compare the defect value with a threshold associated with the defect type;
 determine whether there is a defect of the defect type based at least in part on the comparison; and
 in the event that a defect is detected, output an indication associated with the defect; and
 a memory coupled with the processor, wherein the memory is configured to provide the processor with instructions.

24. The system as recited in claim 23, wherein at least one of the signal samples does not coincide with a peak of the signal.

25. The system as recited in claim 23, wherein computing includes using four signal samples to compute the defect value.

26. The system as recited in claim 23, wherein the set of signal samples is a sequence of signal samples that are sampled at a prescribed sampling rate.

27. The system as recited in claim 23, wherein the defect type includes a drop in/drop out amplitude defect associated with an amplitude gain or loss of 5% or more.

28. The system as recited in claim 23, wherein the defect type includes a shallow amplitude defect associated with an amplitude gain or loss of 5% or less.

29. The system as recited in claim 23, wherein the defect type includes a thermal asperity defect associated with a DC offset.

30. The system as recited in claim 23, wherein the defect type includes a timing defect associated with a phase jump in the signal.

31. The system as recited in claim 23, wherein the defect value is an accumulated defect value that is computed at least in part by summing a first defect value with a second defect value.

32. The system as recited in claim 23, wherein the defect value is based at least in part on an amplitude value or a DC component value.

33. The system as recited in claim 23, wherein the defect value is computed at least in part by taking the difference between a first phase and a second phase.

34. The system as recited in claim 23, wherein the defect value is computed at least in part by taking the difference between a first accumulated phase and a second accumulated phase.

35. The system as recited in claim 23, wherein computing further includes squaring the first difference to obtain a first squared distance.

36. The system as recited in claim 35, wherein computing further includes summing the first squared difference and a second squared difference to obtain a sum of squared differences.

37. The system as recited in claim 36, wherein computing further includes taking the square root of the sum of squared differences.

38. The system as recited in claim 23, wherein computing includes summing the set of signal samples.

39. The system as recited in claim 23, wherein computing further includes dividing the first difference by a second difference to obtain a ratio of differences.

40. The system as recited in claim 39, wherein computing further includes taking the arctangent of the ratio of differences.

41. The system as recited in claim 23, wherein computing includes using a look up table.

42. The system as recited in claim 23, wherein comparing includes determining whether the defect value is greater than the threshold.

43. The system as recited in claim 42, wherein determining includes in the event that the defect value is greater than the threshold, determining that there is a defect.

44. The system as recited in claim 23, wherein the indication includes a location of the defect within a given resolution.

45. A computer program product for detecting a defect on a storage device, the computer program product being embodied in a non-transitory computer readable medium and comprising computer instructions for:

receiving a signal read from a storage device;

sampling the signal with an arbitrary phase offset to obtain a set of signal samples;

computing a defect value for a defect type using the set of signal samples, wherein the defect value is computed at least in part based on a relationship corresponding to a sine waveform, and wherein computing includes computing the difference between a first sample and a third sample in a sequence of three samples to obtain a first difference;

comparing the defect value with a threshold associated with the defect type;

determining whether there is a defect of the defect type based at least in part on the comparison; and in the event that a defect is detected, outputting an indication associated with the defect.

* * * * *